UnitedStates Patent Office 3,664,781
Patented May 23, 1972

3,664,781
SILT STABILIZATION DEVICE
Michael U. Widman, Columbus, Ohio, assignor to The Battelle Development Corporation, Columbus, Ohio
Filed Nov. 24, 1969, Ser. No. 879,339
Int. Cl. B29f 3/04; E02 3/12
U.S. Cl. 425—68
10 Claims

ABSTRACT OF THE DISCLOSURE

The silt on the bottom of a body of water is stabilized by extruding a ribbon of a gelable material onto the silt covered bottom and simultaneously extruding one or more ribbons or streams of a gelling agent onto one or both surfaces of the ribbon of gelable material before the gelable material has dispersed or dissolved, thus providing a gelled flexible and conforming ribbon or blanket covering the bottom. A preferred apparatus for co-depositing such ribbons consists of a depending arm provided with an elongated or slit-shaped jet which is in communication with a pressurized source of a gelable material and which is positioned to extrude the gelable material in ribbon form onto the bottom. One or more slit-shaped jets in communication with a pressurized source of gelling agent is mounted to the depending arm and positioned to extrude gelling agent onto one or more surfaces of the ribbon of gelable material at the instant of its extrusion to effect its coagulation.

BACKGROUND

Figure 1:
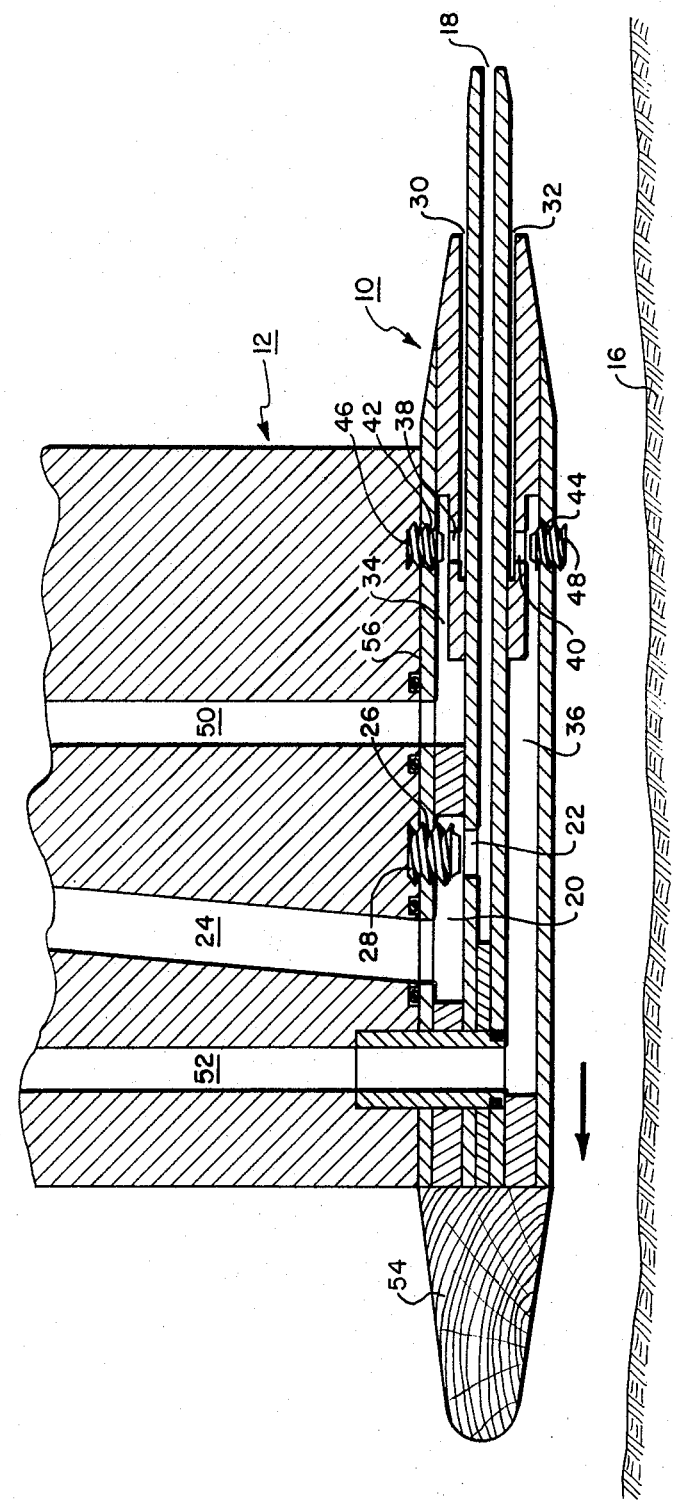

Activities on the bottom of any body of water such as cable laying and repair, underwater salvage operations, etc., are frequently hampered by the presence of deposited silt. Such silt consists of fine granules of sand, mineral, etc., which have settled onto the bottom and which is easily disturbed by turbulence. The silt forms opaque, slow settling clouds above the ocean floor, which severly restrict divers performing complex tasks. Several possible solutions to the silt-clouding problem which has been considered and discarded include evacuation and the installation of a tarpaulin-type covering.

A workable silt-stabilizing system is disclosed in copending patent application Ser. No. 846,243, filed on July 30, 1969, entitled "Stabilizing Silt." In accordance with this system, bottom stabilization is accomplished by gelling a water-soluble polymer on the ocean floor. The gel can be used as a binder to glue the fine particles of silt together into larger agglomerates or to bring together a solution of water-soluble polymer and a suitable gelling agent just above the silt bed in such a way as to form a continuous layer or deposit of a flexible gel above the silt. The gel then functions as a flexible blanket, thus immobilizing the silt.

Any water-soluble polymer that is convertible into an insoluble gel under the conditions of temperature, pressure, and salinity found in the ocean, river, lake, etc., environment can be used for the process of this invention. For example, polysaccharides known as alginates may be converted into water insoluble alginic acid by combination with dilute hydrochloric acid or by reaction with material such as calcium citrate to form insoluble calcium alginate. Such an insolubilized polymer forms a strong mat of gel whose consistency can be varied from soft and jelly-like to hard and tough depending upon the ratio of polymer to gelling agent and solution concentrations.

Other known classes of polymers that provide bottom stabilization polymers include the polyvinyl acetate-crotonic acid copolymer which can be precipitated or gelled into an insoluble mat by reducing the solution pH to seven or below. A still further gelable material is sodium carboxyl methyl cellulose which may be insolubilized or gelled with hydrochloric acid. Hydrogels such as sodium acrylate can be similarly utilized.

Although the application of a gel or polymer such as those described above has been demonstrated to be effective and practical, the actual creation of a continuous gelled ribbon or blanket deposit of such material on the bottom of a body of water has proved to be difficult. For example, it was found the premixing of the gelling agent with the polymer could not be accomplished because gelling action was immediate and premixing resulted in shards and strings of polymer. However, it is also not possible to extrude the gelable material onto the bottom of the body of water in the form of a ribbon or elongated blanket since the ungelled material does not possess sufficient strength to hold itself together. Although it was noted that where the polymer or gelable material was extruded into a pan of hydrochloric acid solution a very acceptable film was obtained, but it is obviously impractical to acidify even small lakes and ponds for this purpose.

THE INVENTION

Contrary to expectations, it has been found that one can deposit a ribbon or blanket of a gelable material onto the bottom of a body of water and contact the surface of such a ribbon after it has been extruded with an appropriate gelling agent prior to the dispersion or dissolution of the gelable material in the surrounding water. Such ribbon or blanket may be transformed in this manner to a continuous gelled or polymerized film of sufficient strength and flexibility to stabilize the silt floor by trapping the surface particles and confining the sub-surface silt.

We have found that such films are most conveniently deposited by continuously extruding the gelable or relatively unpolymerized material through a slit-shaped nozzle or jet onto the silt covered bottom while moving the jet above the bottom. A continuous film may be deposited where such a nozzle or jet is mounted to a depending support that is provided with an appropriate handle for a diver to hold while propelling the apparatus over the silt covered bottom of a body of water. Conduits from a supply of gelable material on an accompanying surface vessel enables one to repeatedly "sweep" a given bottom area laying the ribbon in side-by-side segments to effect continuous silt stabilizing blankets. Since the gelling agent must be brought into contact with the continuously deposited ribbon of gelable or polymerizable material almost instantaneously or within a very short period of time after the deposit of the gelable material, it is most convenient to position one or more slit-shaped nozzles or jet openings immediately adjacent the extruding gellable material. This, of course, is most conveniently done by mounting these jets to the same depending support to which the jet extruding the gelable material is attached. By this means the gelling agent as well as the gelable material may be pumped to the depositing jet or nozzle from sources of supply on the accompanying vessel through conduits in the supporting arm.

Although a single jet extruding gelling agent may be positioned in any manner relative to the extruding gelable material, providing the deposit or stream of gelling agent impinges on the surface thereof to cause the gelable material to polymerize, the parameters of water turbulence caused by positioning such a nozzle makes it preferable that such a jet nozzle be positioned immediately above or below and slightly forward of (in the direction of movement) the nozzle or jet opening through which the gelable material is extruded.

Although the gelling agent may be brought into contact with the extruding gelable material by impingement on the bottom or top surfaces of the ribbon of gelable material, a preferred embodiment is to provide jets of gelling agent both above and below the ribbon of gelable material during its deposition.

Since water turbulence in the area of impingement of the jets of gelling agent onto the surface of the ribbon of gelable material can cause the ribbon to be gelled unevenly and adversely affect the continuity of the gelled ribbon, it is preferred that the jets or nozzles and the supporting arm be structured so that their surfaces provide a streamline smooth (air-foil type) water flow. Such streamlining is accomplished by providing the depending member with a small dimension parallel to the direction of movement. The jet nozzles extending laterally with the supporting arm also will preferably be provided with a structure wherein the assembly is of least dimension in the direction of movement and greatest parallel to such movement so as to provide minimum turbulence to the depositing and gelling ribbon of silt stabilizing material.

Figure 2:
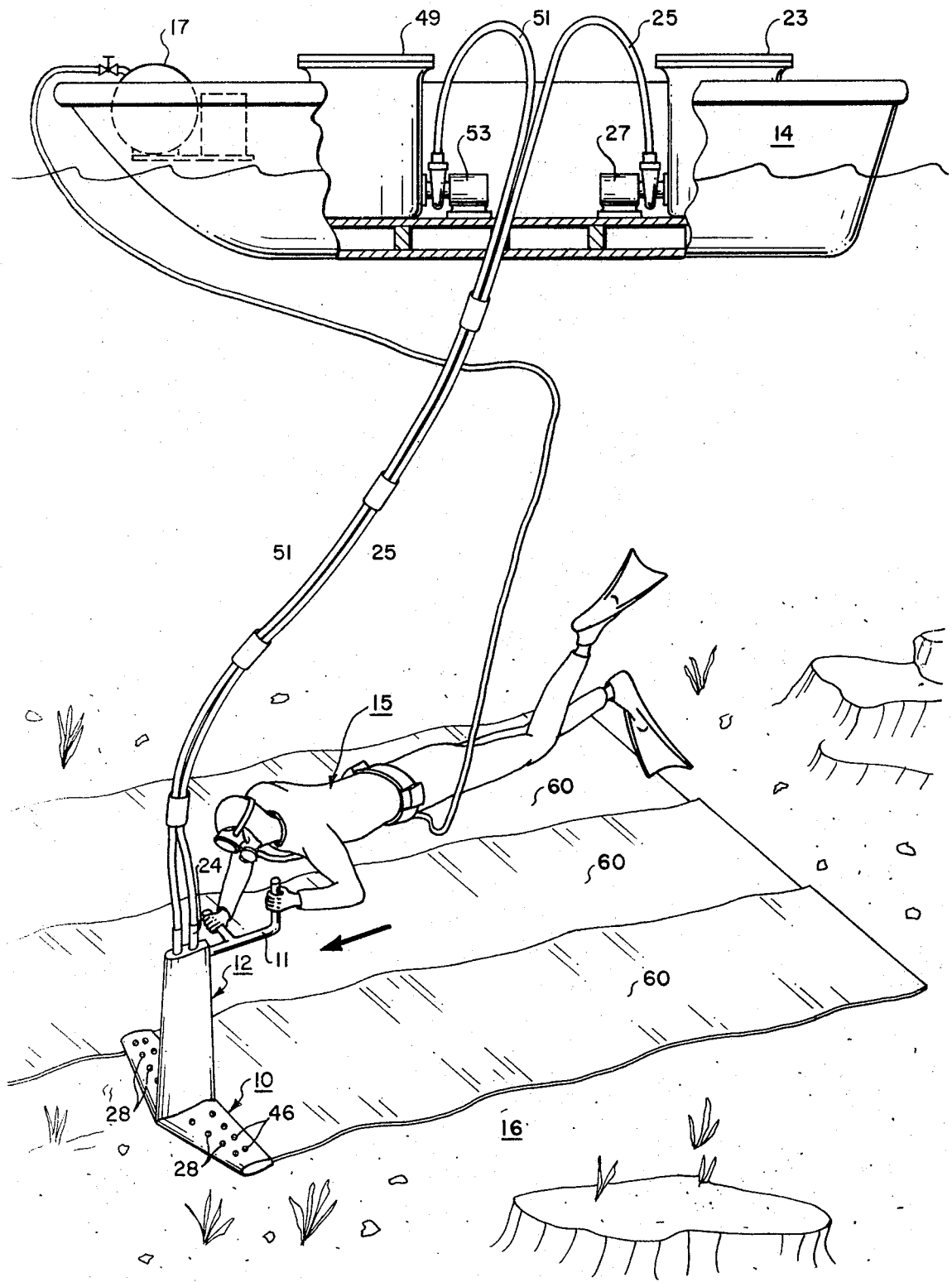

The preferred apparatus of the present invention is best illustrated by the figures of the drawing wherein:

FIG. 1 is a cross-sectional view of a nozzle-supporting apparatus constructed in accordance with the preferred embodiment of the present invention; and FIG. 2 is an illustrative view of a diver or swimmer utilizing the device of FIG. 1 to stabilize the bottom of a body of water.

In the apparatus of FIGS. 1 and 2 a nozzle assembly 10 is shown to be mounted to a depending supporting member or arm 12. An appropriate handle 11 extends from arm 12 for the manual handling and control of the device.

Nozzle assembly 10 is provided with an elongated or slit-shaped opening or nozzle 18 which communicates with an elongated chamber 20 through a series of space circular ports 22. Chamber 20, in turn, communicates with a pressurized source of the gelable material or polymer through a single conduit 24 which leads upwardly through supporting arm 12. The horizontal skin or supporting walls of jet assembly 10 are provided with a series of threaded openings 26 that are positioned above and are axially aligned with ports 22 extending along the elongated nozzle assembly 10. Threaded set screws 28 suitably engaged with the threaded portion of openings 26 project toward and/or into ports 22. Accordingly the pressurized flow of gelable material from its source to nozzle orifice 18 through the chamber 20 may be regulated to obtain uniform flow along the length of opening 18 by appropriate positioning of set screws 28 to vary the restrictive path from chamber 20 through ports 22.

Elongated nozzle openings 30 and 32 communicate with the chambers 34 and 36, respectively, through circular ports 38 and 40. Threaded opening 42 and 44 in the walls of nozzle assembly 10 accommodate set screws 46 and 48 that are axially aligned with the ports 38 and 40, respectively, and serve to restrict or regulate the flow of gelling agent flowing into chambers 34 and 36 through conduits 50 and 52, respectively, to obtain uniform flow along the length of openings 30 and 32. Conduits 50 and 52, of course, extend upwardly through the supporting arm 12 to a pressurized source of gelling agent. Thus, gelling agent flowing from openings 30 and 32 encompass on contact the top and bottom surfaces of the ribbon of gelable material as it emerges from nozzle opening 18.

It should be noted that nozzle assembly 10 is provided with smooth trailing surfaces and a fairing 54 designed to minimize turbulence as the assembly is propelled through water. At no point along the surface 56 of nozzle assembly 10 should the surface deviate from its axial alignment more than about 20 degrees (except of course at its extremities). It should also be noted that supporting arm 12 is constructed in a like manner also preferably not deviating from its horizontal axis more than about 20 degrees.

The illustrative drawing of FIG. 2 shows the device of FIG. 1 as being manually controlled by a diver or swimmer 15 who is provided with a conventional diving apparatus including fins and a source of air 17 aboard an appropriate accompanying surface vessel 14.

The source of polymer or gelable material such as sodium alginate is maintained in the container 23 aboard vessel 14 and is supplied to conduit 24 through a suitable hose 25 by means of a pump 27. In a similar manner a gelling agent such as hydrochloric acid is maintained in the container 49 aboard vessel 14 and is supplied to conduits 50 and 52 through a suitable hose 51 by means of a pump 53.

By propelling the device of FIG. 1 in the direction of the arrow so that the nozzle assembly 10 passes over the silt covered bottom 16 while polymer or gelable material is extruded from nozzle 18 and gelling agent is extruded from nozzles 30 and 32, it is possible to lay gelled ribbons 60 onto the bottom 16. Ribbons 60 are flexible and conform to the bottom so that when deposited in side-by-side relationship (as shown) they form a covering blanket that serves to stabilize the silt covered bottom 16.

Apparatus such as that depicted by FIGS. 1 and 2 of the drawings was tested in a tank 20 feet long by 4 feet wide by 20 inches deep. Rails were mounted along the top of the 20-foot sidewalls of the tank and a carriage with appropriate rail engaging wheels was seated on the rails for longitudinal movement above the tank. A variable speed capstan mounted to one end of the tank was disposed to drive the carriage over the tank. The depending member 12 was mounted to the carriage so as to extend into the tank and position the nozzle assembly over the tank bottom to deposit longitudinal ribbons of gelable material thereon. Two assemblies were employed, both having ⅛-inch wide slit nozzles 18 for depositing gelable material and 1/16-inch wide slit nozzles 30 and 32 (above and below 18), for depositing gelling agent. One assembly had 12-inch long nozzles (extending along the width of the tank) and the other had 3-foot long nozzles.

The bottom of the tank was covered with sand and gravel to simulate silt and the tank was filled with water. Testing was conducted using both fresh and sea water.

Gelable material and gelling agent were pumped to the respective nozzles while the capstan was operated to propel the nozzle assemblies over the bottom of the tank in the direction corresponding to the arrow of FIG. 1 and deposit polymer and gelling agent in the manner described.

In one series of tests the gelable material consisted of a solution of Keltex (sodium alginate) (trademark of Kelco Company). Keltex was present as a 1.5 percent, by weight, solution. The gelling agent was a 2 percent, by weight, solution of hydrochloric acid. The gelable material or Keltex solution was pumped through the nozzle at approximately four gallons per minute. About two gallons per minute of gelling agent were pumped through the upper and lower openings. Positive displacement pumps were used so that the proportion of gelling agent to polymer could be controlled. The carriage was propelled along the rails to move the nozzle above the bottom of the tank during extrusion. Continuous ribbons (12 inches and 3 feet wide) of gelled alginate of surprising strength were deposited over the bottom confining the sand and gravel in a manner to prevent any turbulence.

The results of additional tests with the above-described apparatus using aqueous solutions of sodium alginate (various grades of Keltex and Kelco solutions manufactured by Kelco Company) as the gelable material, HCl or $CaCl_2$ solutions as the gelling agent, and various filler (in the sodium alginate solutions) are set forth in the following table:

a gelling agent onto both surfaces of said ribbon of gelable material prior to its dispersion in said body of water.

TABLE 1.—SUMMARY OF MATERIAL EXPERIMENTS IN TEST TANK

| Test | Polymer (percent) | Percent gelling agent [a] | Film thickness, in. | Filler [b] | Polymer specific gravity | Remarks [c] |
|---|---|---|---|---|---|---|
| 1 | Keltex (1½) | 2 HCl | ¼ | Ink [d] | 1.000+ | Somewhat weak, no shrinkage. |
| 2 | Kelco LV (3) | 20 CaCl₂ | ⅛ | do | 1.000+ | Very tough—30-55 percent shrinkage. |
| 3 | Keltex (1½) | 2 HCl | ⅛ | do | 1.000+ | Good strength, higher HCl flow, no shrinkage. |
| 4 | do | 5 CaCl₂ | ⅛ | do | 1.000+ | Very poor, 55 percent shrinkage, liquid center. |
| 5 | do | 10 HCl | ⅛ | do | 1.000+ | Good film, poor strength, 100 percent shrinkage. |
| 6 | Kelco LV (3) | 5 CaCl₂ | | do | 1.000+ | Very poor, no film. |
| 7 | do | 10 HCl | ⅛ | do | 1.000+ | Good film lay, weak, no shrinkage. |
| 8 [e] | Keltex (1½) | 5 HCl | ⅛ | 875 g. TiO₂ plus 100 cc. H₂O | 1.045 | Good strength, 10 percent shrinkage. |
| 9 [e] | do | 5 HCl | ⅛ | 275 g. PbO₂ plus 300 cc. H₂O | 1.020 | Very tough, pregelled before lay, 50-60 percent shrinkage. |
| 10 [e] | do | 5 HCl | ⅛ | 1,800 g. Pb-Sn powder plus 150 mesh | [f] 1.060 | Good tough film, 10 percent shrinkage—jammed pumps, all not dispersed. |
| 11 [e] | do | 5 HCl | ⅛ | 1,600 g. TiO₂ | 1.075 | Very poor, soft, thick narrow film. |
| 12 [e] | do | 5 HCl | ⅛ | 900 g. TiO₂ | 1.050 | Good strength, 10 percent shrinkage. |

[a] All solutions were prepared using distilled water (14,800 cc. of solution).
[b] Ink fillers were included to render the gelled ribbon visible, TiO₂ and Pb-Sn powder fillers were included to strengthen the gelled ribbon.
[c] Results are relative since all of the deposits were adequate for silt stabilization.
[d] Used to observe flow.
[e] Three-foot nozzle.
[f] Only about half of the powder stayed dispersed (estimate).

I claim:
1. Apparatus comprising
    streamlined housing means for moving forwardly parallel to the streamlining over substantial areas in a body of water; and
    means in said housing for depositing a sheet of a gelled material on the bottom of the body of water; said despositing means comprising
        slit-shaped first nozzle means for depositing a ribbon of a gelable material onto said bottom; and
        slit-shaped second nozzle means for depositing at least one stream of a gelling agent onto a surface of said ribbon of gelable material after its entry into said body of water and prior to its dispersion in said body of water so as to cause said gelable material to solidify;
            said nozzle means facing rearwardly and parallel to the streamlining with said first nozzle means extending rearwardly beyond said second nozzle means;
        said housing means comprising
            a normally horizontal first streamlined section for movement forwardly parallel to the streamlining along the bottom of he body of water; and
            a normally vertical second streamlined section extending upwardly from the central portion of the first section and provided with means for manual guilding thereof comprising an elongated arm extending therefrom and having spaced apart handle portions suitable for grasping by a person while moving through the water in the forward direction.

2. The apparatus of claim 1, wherein said first nozzle means is provided with a pressurized source of said gelable so that said ribbon is extruded from said nozzle means.

3. The apparatus of claim 2, wherein said second nozzle means is provided with a pressurized source of said gelling agent so that said at least one stream of gelling agent is extruded from said second nozzle means.

4. The apparatus of claim 1, wherein said second nozzle means comprises means for depositing a stream of a gelling agent onto both surfaces of said ribbon of gelable material prior to its dispersion in said body of water.

5. The apparatus of claim 3, wherein said first and second nozzle means are positioned parallel to and adjacent one another, said second nozzle means being disposed to impringe at least one flat surface of said ribbon of gelable material.

6. The apparatus of claim 4, wherein said second nozzle means includes a nozzle above and a nozzle below said first nozzle means positioned forwardly therefrom in the direction of said movement for extruding gelling agent onto the top and bottom surfaces of said ribbon of gelable material.

7. The apparatus of claim 1, wherein said second streamlined section is elongated in a plane parallel with the direction of movement and formed with a smooth surface so as to reduce resistance to movement.

8. The apparatus of claim 7, wherein the nozzle slits lie in a plane that is essentially transverse to the elongated plane of said second streamlined section.

9. The apparatus of claim 7, wherein the first streamlined section is formed into an elongated structure in the plane of the slit openings and provided with a smooth surface so as to reduce resistance to movement and minimize turbulence where the gelling agent contacts the surface of the ribbon of gelable material.

10. The apparatus of claim 9, wherein conduits leading to said nozzles extend through said first streamlined section to a source of gelable material and a source of a gelling agent, respectively.

References Cited

UNITED STATES PATENTS

| | | | |
|---|---|---|---|
| 3,448,183 | 6/1969 | Chisholm | 18—13 P X |
| 3,057,694 | 10/1962 | Kessler | 18—5 P UX |
| 3,446,027 | 5/1969 | Meijer | 61—63 |

J. SPENCER OVERHOLSER, Primary Examiner

N. E. LEHRER, Assistant Examiner

U.S. Cl. X.R.

264—178; 61—63; 425—113, 131, 382, 104